(12) United States Patent
Knobbe

(10) Patent No.: US 9,499,401 B2
(45) Date of Patent: Nov. 22, 2016

(54) RADIAL FLOW REACTOR SYSTEMS AND RELATED METHODS

(71) Applicant: Intelligent Energy Limited, Loughborough (GB)

(72) Inventor: Mack Knobbe, Folsom, CA (US)

(73) Assignee: Intelligent Energy Limited, Loughborough (GB)

( * ) Notice: Subject to any disclaimer, the term of this patent is extended or adjusted under 35 U.S.C. 154(b) by 76 days.

(21) Appl. No.: 14/671,708

(22) Filed: Mar. 27, 2015

(65) Prior Publication Data

US 2015/0274522 A1   Oct. 1, 2015

Related U.S. Application Data

(60) Provisional application No. 61/972,203, filed on Mar. 28, 2014.

(51) Int. Cl.
| | |
|---|---|
| *C01B 3/06* | (2006.01) |
| *H01M 8/04* | (2016.01) |
| *H01M 8/06* | (2016.01) |
| *B01J 7/02* | (2006.01) |

(52) U.S. Cl.
CPC .. *C01B 3/06* (2013.01); *B01J 7/02* (2013.01); *H01M 8/04208* (2013.01); *H01M 8/04216* (2013.01); *H01M 8/065* (2013.01); *Y02E 60/36* (2013.01); *Y02E 60/50* (2013.01)

(58) Field of Classification Search
CPC ........... H01M 8/065; H01M 8/04208; H01M 8/04216; C01B 3/06
See application file for complete search history.

(56) References Cited

U.S. PATENT DOCUMENTS

| | | | |
|---|---|---|---|
| 2007/0189940 A1* | 8/2007 | Shurtleff | B01J 7/02 422/239 |
| 2008/0026269 A1* | 1/2008 | Shurtleff | H01M 8/04007 429/414 |
| 2009/0029227 A1* | 1/2009 | Patton | C01B 3/065 429/416 |
| 2010/0247426 A1 | 9/2010 | Wallace et al. | |
| 2013/0115536 A1* | 5/2013 | Barton | B01J 7/00 429/423 |
| 2013/0344407 A1* | 12/2013 | Mick | H01M 8/04201 429/416 |
| 2014/0014205 A1 | 1/2014 | Barton | |

* cited by examiner

*Primary Examiner* — Stewart Fraser
(74) *Attorney, Agent, or Firm* — Baker & Hostetler LLP

(57) ABSTRACT

The present disclosure provides liquid/solid phase reactor systems that generate product gases. The present disclosure also provides for methods of generating gas using the systems of the present disclosure.

15 Claims, 8 Drawing Sheets

RADIAL FLOW REACTOR SYSTEMS AND RELATED METHODS

RELATED APPLICATION

This application claims priority to U.S. provisional patent application No. 61/972,203, filed Mar. 28, 2014, the entirety of which is incorporated herein by reference.

FIELD OF THE DISCLOSURE

This disclosure is in the field of reactors for use with liquid/solid phase reactants that generate product gases. In particular, the disclosure relates to devices and methods for use in hydrogen fuel cell reactors.

BACKGROUND

Fuel cells are electrochemical energy conversion devices that convert an external source fuel into electrical current. Many common fuel cells use hydrogen as the fuel and oxygen (typically from air) as an oxidant. The by-product for such a fuel cell is water, making the fuel cell a very low environmental impact device for generating power.

The challenge of hydrogen storage and generation has limited the wide-scale adoption of fuel cells. Although molecular hydrogen has a very high energy density on a mass basis, as a gas at ambient conditions it has very low energy density by volume. The techniques employed to provide hydrogen to portable applications are widespread, including high pressure and cryogenics, but they have most often focused on chemical compounds that reliably release hydrogen gas on-demand. In some chemical reaction methods for producing hydrogen for a fuel cell, hydrogen storage and hydrogen release are catalyzed by a modest change in temperature or pressure of the chemical fuel. In other reaction methods, liquid reactants may be contacted with solid reactants to generate product gases.

One typical problem with chemical hydrolysis is the tendency of the liquid byproducts to foam, which creates control and volume efficiency problems. High flow velocities may contribute to the foaming of slurry phase products. In some instances, foaming byproducts can block the flow area and relief devices, which may lead to over pressure issues. Another common issue with hydrolysis based reactions is that crystal hydrate byproducts are often formed. This traps some unreacted water into a water reactive material. The stability of these hydrates is often temperature dependent, which byproduct release water at elevated temperatures. If energy is later added either during operation, transport or storage, it is possible to release that water and generate hydrogen either unexpectedly or uncontrollably. Since water reactive control systems typically control water injection to manage gas pressure, a build up a hydrated byproduct represents a loss of control.

Thus, there is a need for improved hydrogen generation systems and methods that overcome many, or all, of the above problems or disadvantages in the prior art. The disclosure is directed to these and other important needs.

DISCLOSURE

The present disclosure provides aspects of hydrogen gas generating systems comprising a cartridge that comprises a casing comprising an outer housing, an internal compartment comprising two end caps comprising solid material impermeable to gas flow and one or more side walls configured to be gas permeable and restrictive of liquid and solid material transport, a hydrogen outlet valve in the casing, a hydrogen flow path from a volume between the one of the one or more internal compartment side walls and the outer housing to the hydrogen outlet valve, a solid reactant material disposed within the internal compartment, said solid reactant material comprising a hydrogen containing material capable of releasing hydrogen gas when contacted with a liquid reactant, and one or more fluid distribution networks disposed within the internal compartment and configured to deliver the liquid reactant to the solid reactant material, and the hydrogen generating systems further comprising a fluid injection system configured to controllably provide the liquid reactant through at least one end cap and into the one or more fluid distribution networks. The present disclosure also provides fuel cell systems comprising a fuel cell battery and one or more hydrogen gas generating systems as provided herein.

The present disclosure provides methods of generating hydrogen gas comprising disposing a solid reactant material within an internal compartment of a cartridge, wherein said cartridge comprises a casing comprising an outer housing, an internal compartment comprising two end caps comprising solid material impermeable to gas flow and one or more side walls configured to be gas permeable and restrictive of liquid and solid material transport, a hydrogen outlet valve in the casing, a hydrogen flow path from a volume between the one of the one or more internal compartment side walls and the outer housing to the hydrogen outlet valve, a solid reactant material disposed within the internal compartment, said solid reactant material comprising a hydrogen containing material capable of releasing hydrogen gas when contacted with a liquid reactant, and one or more fluid distribution networks disposed within the internal compartment and configured to deliver a liquid reactant to the solid reactant material, and the method further comprising selectively providing the liquid reactant with a fluid injection system configured to controllably provide the liquid reactant through at least one end cap, into the one or more fluid distribution networks, and to the solid reactant material to initiate a reaction between the liquid reactant and the solid reactant material to release hydrogen gas. The present disclosure also provides methods of generating power comprising providing hydrogen gas generated according to the methods as provided herein to a fuel cell battery.

The present disclosure provides hydrogen gas generators comprising a cylindrical cartridge, wherein the cylindrical cartridge comprises a cylindrical casing comprising a cylindrical outer housing, a cylindrical internal compartment comprising two circular end caps comprising solid material impermeable to gas flow and a cylindrical side wall configured to be hydrogen-gas permeable and restrictive of liquid and solid material transport, a hydrogen gas outlet valve in the casing, a hydrogen gas flow path from an annular volume between the cylindrical side wall and the cylindrical outer housing to the hydrogen gas outlet valve, a solid reactant material disposed within the internal compartment, said solid reactant material comprising a powder bed of hydrogen containing material capable of releasing hydrogen gas when contacted with water, and one or more fluid distribution networks disposed within the internal compartment and configured to deliver the water to the solid reactant material, and wherein the hydrogen gas generators further comprise a fluid injection system configured to controllably provide the water through at least one circular end cap and into the one or more fluid distribution networks, wherein the one or more fluid distribution networks comprise two independent spiral-shaped networks spaced axially along the cylindrical internal compartment such that one distributes water to the top of the cylindrical internal compartment while the other network distributes fluid to the bottom of the internal compartment, and wherein the fluid injection system is disposed external to the cartridge.

The general description and the following detailed description are exemplary and explanatory only and are not restrictive of the disclosure, as defined in the appended claims. Other aspects of the present disclosure will be apparent to those skilled in the art in view of the detailed description of the disclosure as provided herein.

DRAWINGS

The summary, as well as the following detailed description, is further understood when read in conjunction with the appended drawings. For the purpose of illustrating the disclosure, there are shown in the drawings exemplary implementations of the disclosure; however, the disclosure is not limited to the specific methods, compositions, and devices disclosed. In addition, the drawings are not necessarily drawn to scale. In the drawings.

Figure 1:
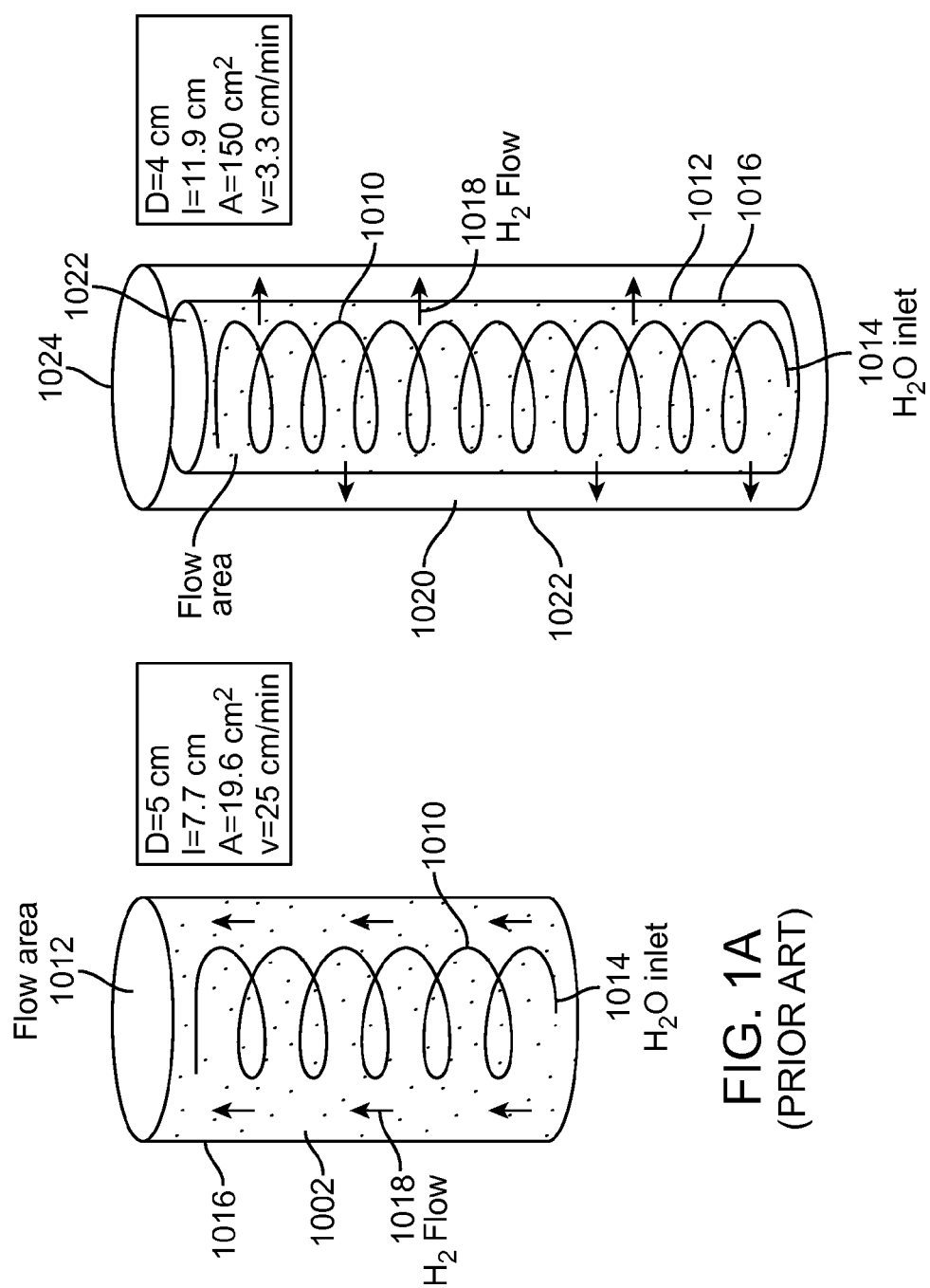
FIG. 1A illustrates a prior art gas generating system.
FIG. 1B illustrates aspects of a gas generating system in an exemplary implementation of the present disclosure.

All callouts in the attached figures are hereby incorporated by this reference as if fully set forth herein.

It should be appreciated that, for simplicity and clarity of illustration, elements shown in the figures have not necessarily been drawn to scale. For example, the dimensions of some of the elements are exaggerated, relative to each other, for clarity. Further, where considered appropriate, reference numerals have been repeated among the Figures to indicate corresponding elements. While the specification concludes with claims defining the features of the present disclosure that are regarded as novel, it is believed that the present disclosure's teachings will be better understood from a consideration of the following description in conjunction with the figures in which like reference numerals are carried forward.

FURTHER DISCLOSURE

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular exemplars by way of example only and is not intended to be limiting of the claimed disclosure. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another exemplar includes from the one particular value and/or to the other particular value. Similarly, when values are expressed as approximations, by use of the antecedent "about," it will be understood that the particular value forms another exemplar. All ranges are inclusive and combinable.

It is to be appreciated that certain features of the disclosure which are, for clarity, described herein in the context of separate exemplar, may also be provided in combination in a single exemplary implementation. Conversely, various features of the disclosure that are, for brevity, described in the context of a single exemplary implementation, may also be provided separately or in any subcombination. Further, reference to values stated in ranges include each and every value within that range.

In one aspect, the present disclosure provides gas generators comprising a cartridge 200 and a fluid injection system 400. The fluid injection system 400 can be an external means of fluid injection or can be a system incorporated internally within the cartridge volume. The cartridge 200 can provide a volume for solid reactant material 302, to which fluid reactant can be introduced in a controlled manner by the fluid injection system 400. The solid reactant material 302 and fluid reactant can react to produce gaseous products and liquid or solid byproducts. The cartridge can be configured to separate the gaseous product from the byproducts. In some implementations the gaseous product is hydrogen gas. In exemplary implementations the solid reactant material 302 is a hydrogen containing material that reacts with the fluid reactant to produce hydrogen gas. In some implementations the fluid reactant is water. In some exemplary implementations the solid reactant material 302 comprises alkali metal silicides as described in U.S. patent application Ser. No. 12/750,527, the entirety of which is incorporated by reference herein.

Figure 4:
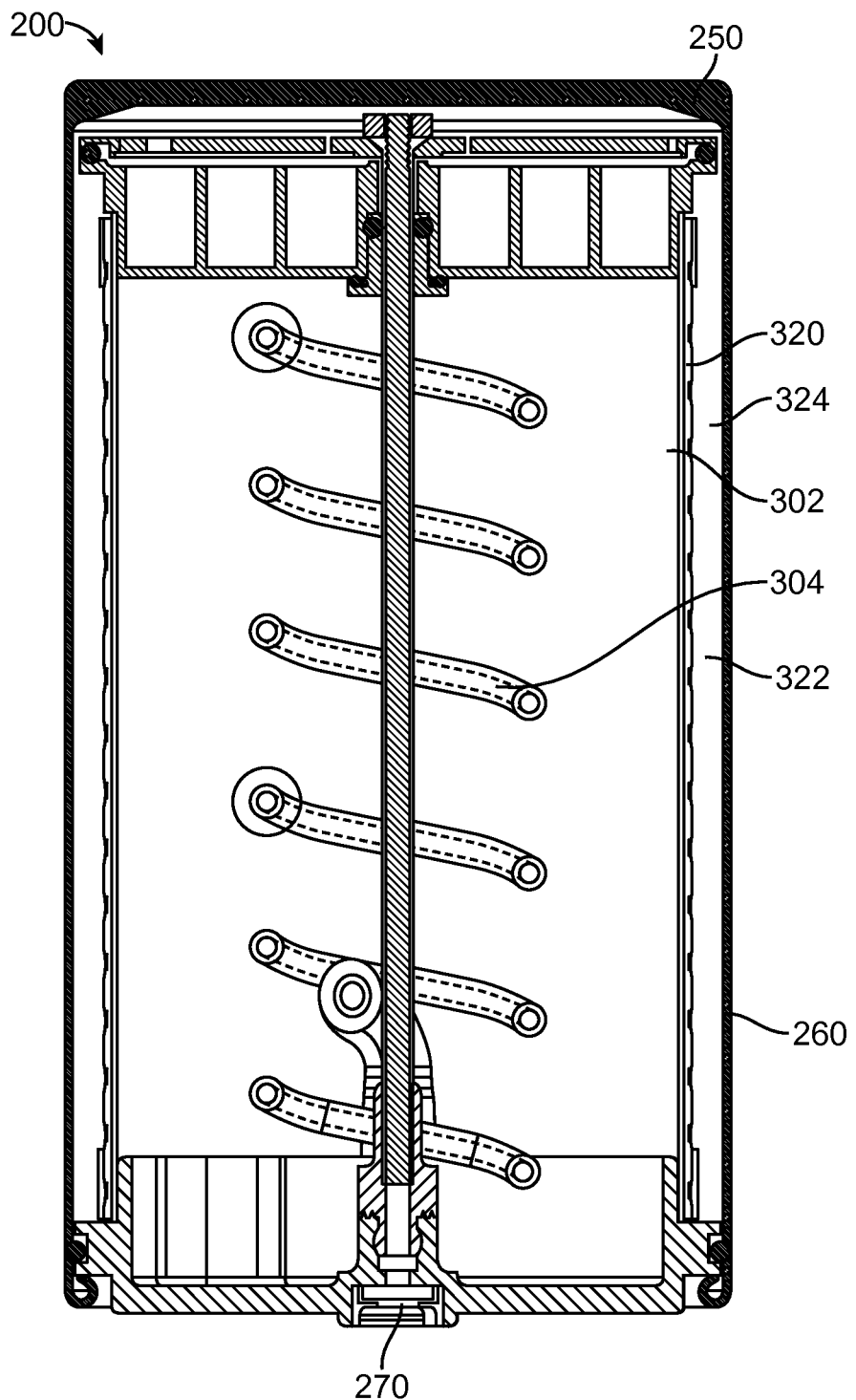
FIG. 4 illustrates aspects of a gas generating system in an exemplary implementation of the present disclosure.

In some exemplary implementations, the cartridges 200 can comprise a casing 250, an internal compartment 300, a hydrogen outlet valve 270, and one or more fluid distribution networks 304. The casing can comprise an outer housing 260. The structure of the outer housing 260 determines the direction of gas flow to the application, which is independent of the internal compartment 300. Outputs, including the hydrogen outlet valve 270, can be located in the casing 250 in any location as desired. Casing 250 can provide for a gas filter or dryer 333 in some embodiments. FIG. 4 depicts an exemplary implementation of outputs and inputs through a single external interface. Inputs can be located anywhere in the casing 250 that can provide for appropriate fluid delivery to the fluid distribution networks 304.

Figure 2:
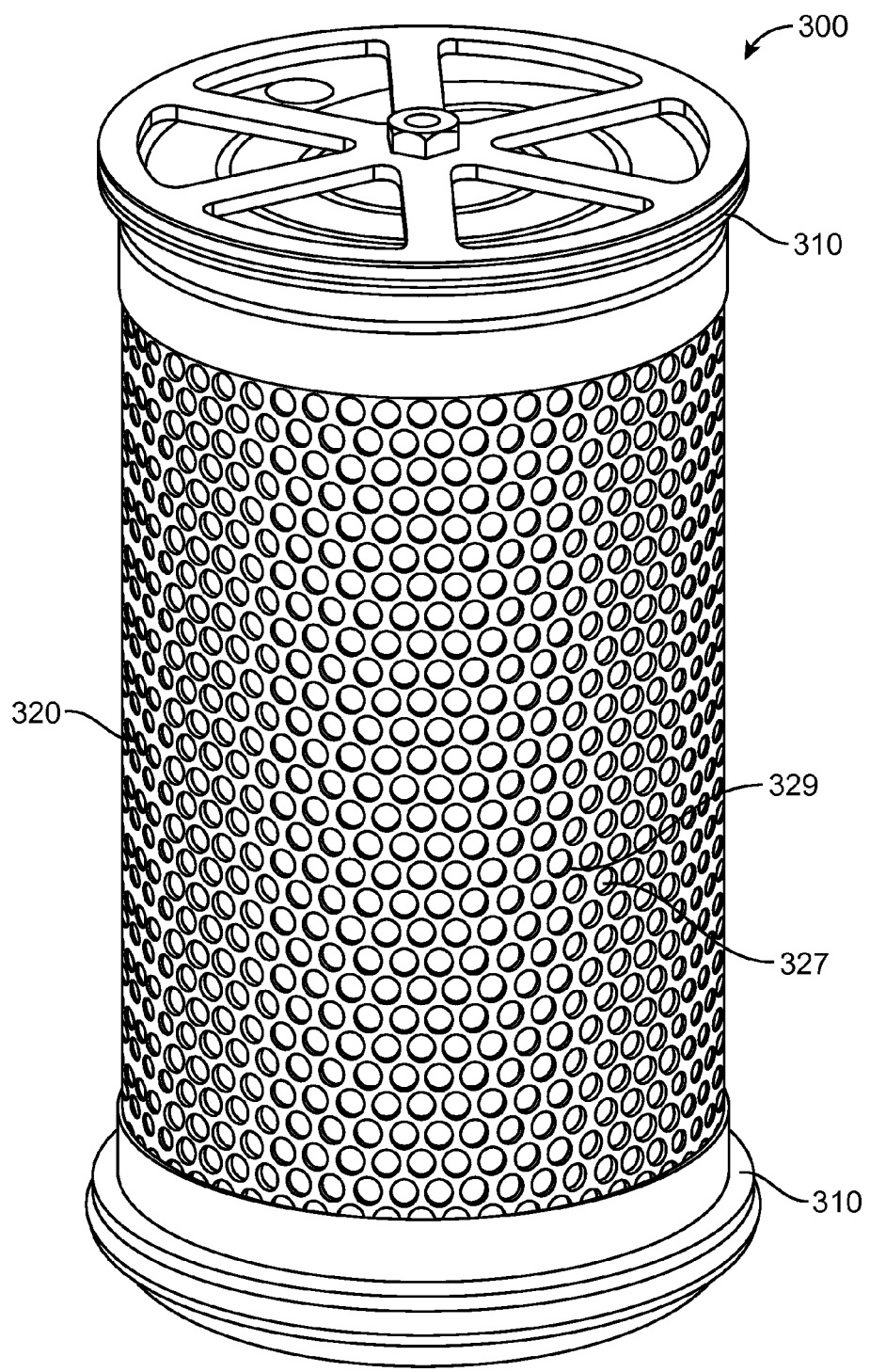
FIG. 2 illustrates aspects of a gas generating system in an exemplary implementation of the present disclosure.

In exemplary implementations, the internal compartment 300 can comprise two end caps 310 of solid material that is impermeable to gas flow. The internal compartment 300 can further comprise one or more side walls 320 configured to be gas permeable and restrictive of liquid and solid material transport. The internal compartment 300 is configured to contain a solid reactant material 302. The one or more side walls 320 can comprise a cylindrical side wall in some implementations. In exemplary implementations, the one or more side walls can be made of materials and structures that allow for gas molecules to pass through while preventing liquid and solid material transport. The combination of the gas-impermeable end caps and the gas-permeable side walls forces any gas generated within the internal compartment to flow radially outward through the side walls during operation. An exemplary implementation of an internal compartment 300 is depicted in FIG. 2. An internal gas gap 322 can be provided in a volume between one of the one or more internal compartment side walls 320 and a portion of the outer housing 260. The internal gas gap 322 can form part of a hydrogen flow path that leads to the hydrogen outlet valve. An exemplary hydrogen flow path 324 is depicted with arrows in FIG. 4. FIG. 4 shows a cross-section view of a cartridge 200.

In some implementations the one or more side walls 320 are constructed from metal screen, perforated metal, or wire mesh of various porosities to provide structural support with limited gas flow impedance. In further implementations, structural support can be provided by a central post 331 connected between the two end caps 310. In some implementations, the central post can provide means to transmit one or more fluids through the internal compartment 300.

Figure 3:
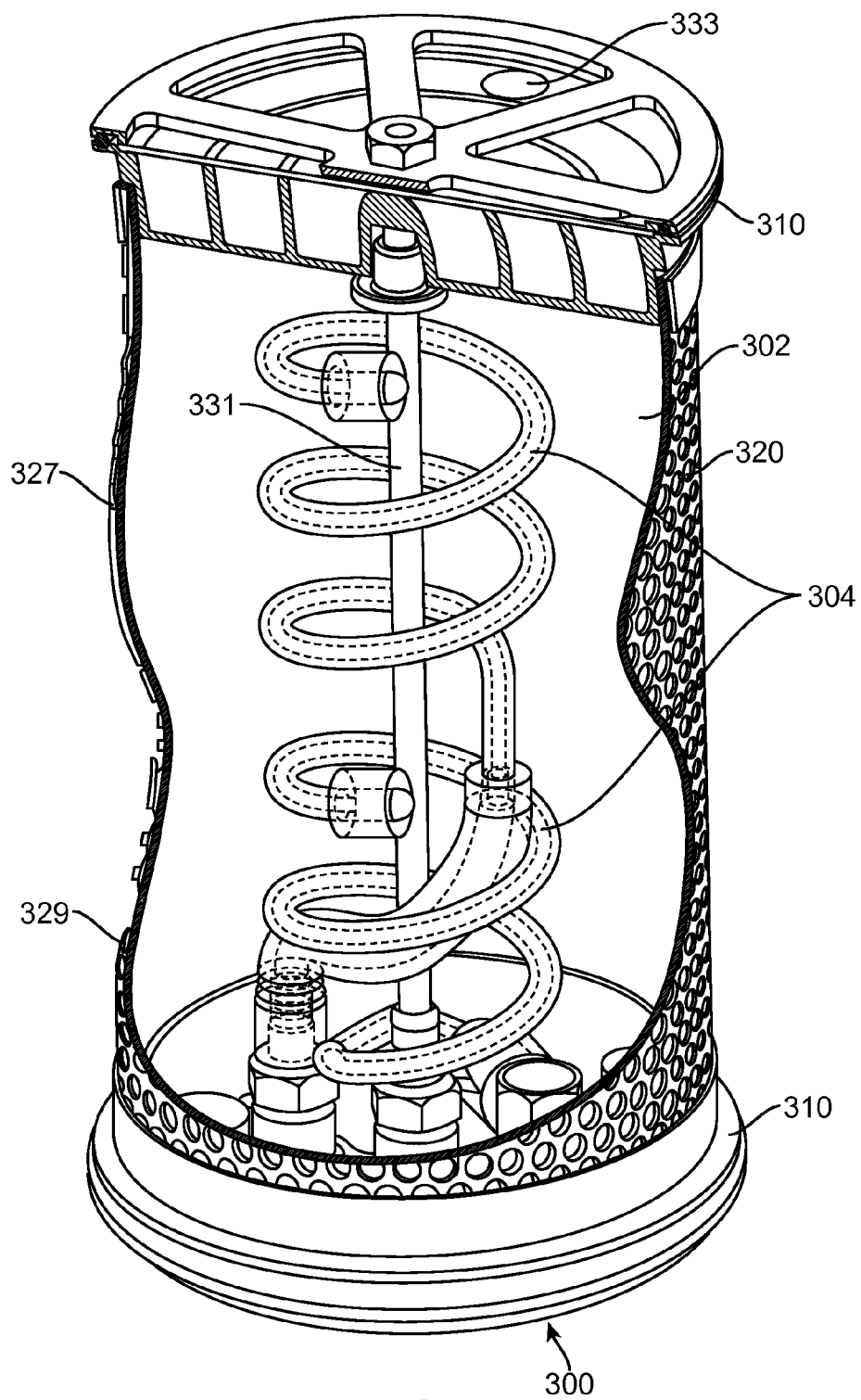
FIG. 3 illustrates aspects of a gas generating system in an exemplary implementation of the present disclosure.

In exemplary implementations, the one or more side walls provide further containment for byproducts. Further containment may be accomplished by adding filtration layers to the one or more side walls. The filtration layers can comprise physical filtration layers, chemical filtration layers, or a combination of both. The layers can include filters with varying degrees of hydrophobicity to enhance the ability to restrict liquid byproducts. Filter materials can comprise PTFE, polypropylene, and similar materials. Additional layers can comprise fabric or fibrous materials that physically protect less robust hydrophobic layers from physical and thermal damage. In some implementations, the filter layers can strain out soluble byproducts that reduce the efficacy of the hydrophobic filter layers. In exemplary implementations, the filtration layers can comprise compressible layers that account for expansion of the internal compartment. In some exemplars, the filtration layers can comprise chemical filtration materials to filter contaminants. In further exemplars, desiccant layers can be included to capture condensable vapors. Filtration layers can be repeated to provide enhanced containment. In an exemplary implementation, the one or more side walls comprise layers of wire mesh, PTFE membrane, and fiberglass. An exemplary implementation of a side wall 320 is illustrated in FIG. 3, which depicts a cut-away view of an internal compartment 300 with a portion of side wall 320 not shown to expose the internal components. FIG. 3 shows an internal compartment 300 with side wall 320 having gas-permeable filter layers 327 surrounded by a perforated metal or wire screen 329.

In exemplary implementations, the cartridges 200 of the present disclosure are configured to receive injections of liquid or gaseous reactants through one or both end caps 310 of the internal compartment. The injected reactants can flow through one or more fluid distribution networks 304 disposed within the internal compartment 300 and configured to deliver the fluid reactant to the solid reactant material 302. In some implementations, the internal compartment 300 can contain multiple independent fluid distribution networks. The fluid distribution networks 304 can have many injection points. The fluid distribution networks can be formed in various geometries and structures. In some implementations, the fluid distribution networks may be straight or spiral shapes. In exemplary implementations, independent fluid distribution networks can be spaced apart axially or radially. In FIG. 3, an exemplary implementation of fluid distribution networks 304 is shown with two independent spiral-shaped networks spaced axially such that one distributes fluid to the top of the internal compartment 300 while the other network distributes fluid to the bottom of the internal compartment 300. Other implementations can include straight networks that are spaced radially such that each independent network delivers fluid to sections of a circular cross section. Fluid distribution networks can be configured to be static structures that remain in the same relative location within the internal compartment throughout operation or can be configured to be dynamic during operation.

Figure 5:
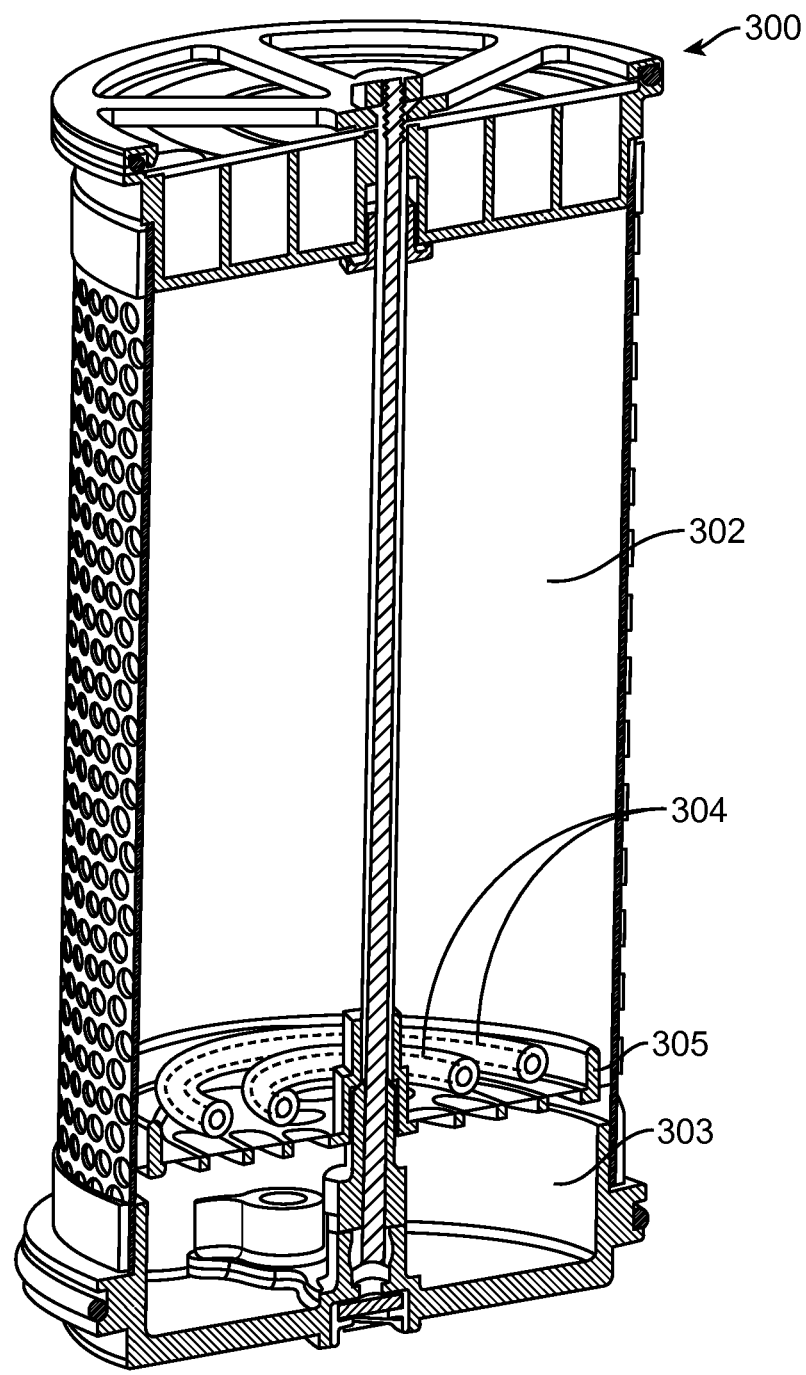
FIG. 5 illustrates aspects of a gas generating system in an exemplary implementation of the present disclosure.
Figure 6:
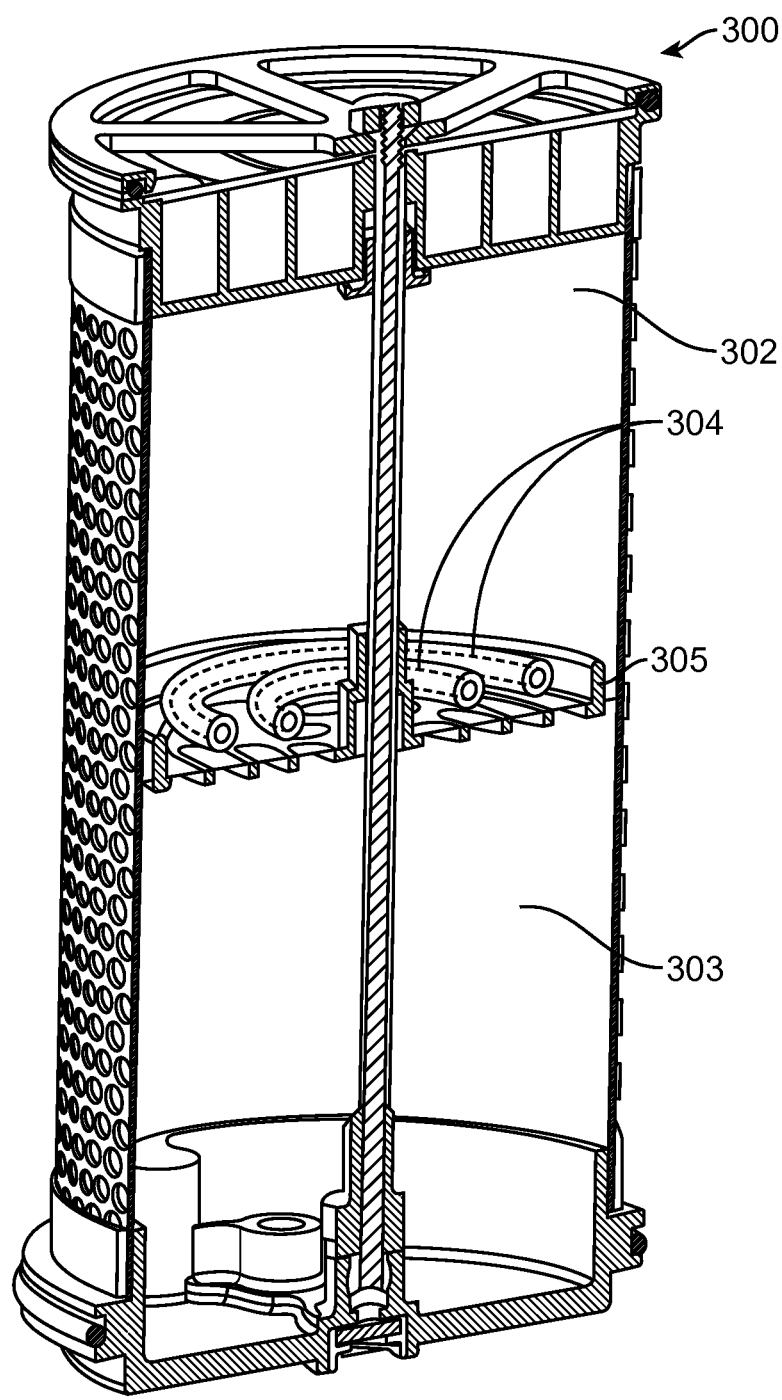
FIG. 6 illustrates aspects of a gas generating system in an exemplary implementation of the present disclosure.
Figure 7:
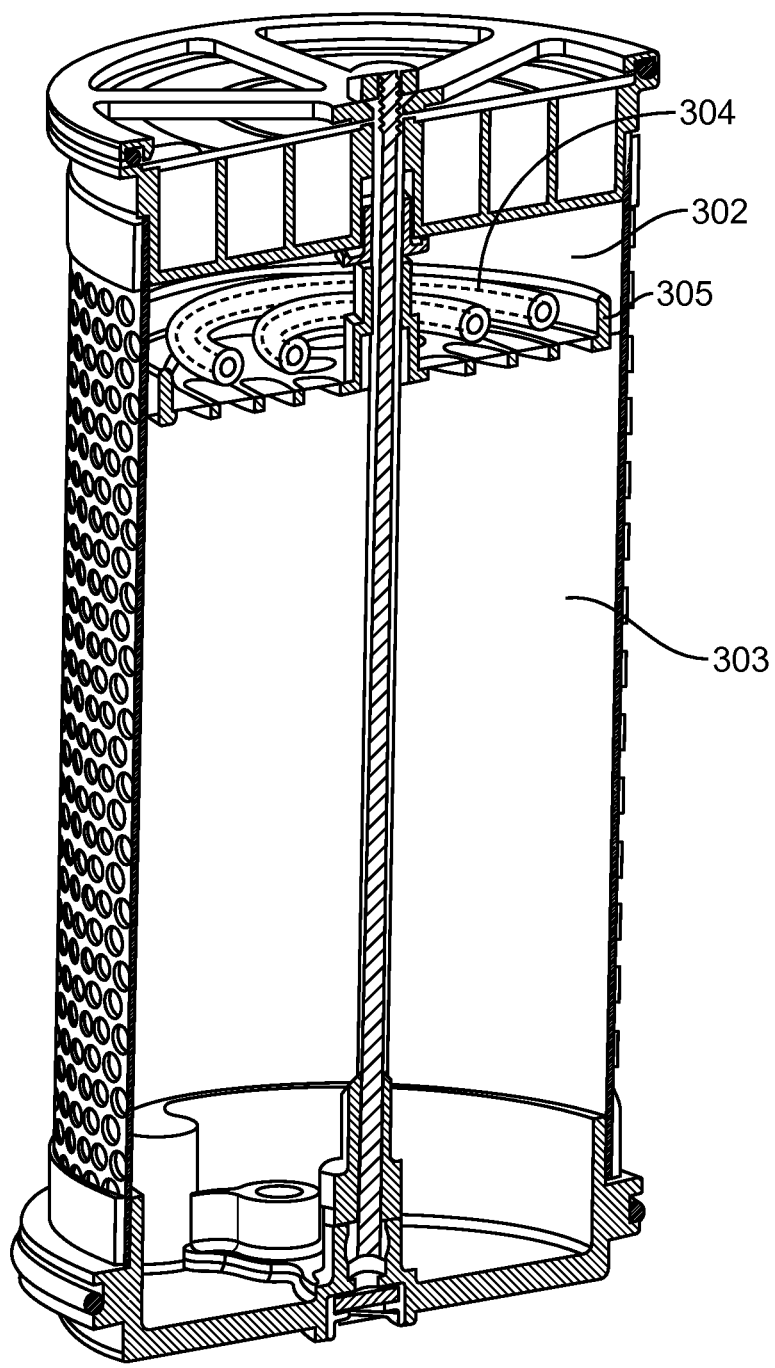
FIG. 7 illustrates aspects of a gas generating system in an exemplary implementation of the present disclosure.

In exemplary implementations the fluid distribution networks 304 may be dynamic and change the location of fluid injection throughout the operation of the system. FIGS. 5, 6, and 7 depict aspects of an exemplary implementation of a hydrogen gas generating system with a dynamic fluid distribution network system, in cut-away views that depict a cross-section of an internal compartment 300 and internal components. Fluid distribution networks 304 are disposed on a movable fluid injection plate 305, which can be perforated to allow for byproduct to pass through the perforations as the moveable fluid injection plate 305 dynamically moves through the internal compartment 302. FIG. 5 depicts the system in the initial position, with unreacted solid reactant material 302 in the upper portion and byproducts 303 in the lower portion. FIG. 6 depicts the system after some portion of the solid reactant material 302 has been depleted as the fluid distribution networks 304 are moved dynamically upwards through the internal compartment 300. FIG. 7 depicts the system after depletion of substantially all of the solid reactant. In FIGS. 5, 6, and 7 fluid distribution networks 304 are provided with a radial structure, which contains the byproduct and allows gas to flow radially at all the positions the networks 304 can sit. In this manner, the fluid distribution networks 304 moves away from byproduct material to limit transport limitation that can occur in depleted cartridges where the ratio of reactive material to unreactive material is low. In exemplary implementations with dynamic fluid distribution networks, the networks can be actively moved by means of a control system such as a motor or auger, or passively with the use of a spring or other mechanism. Dynamic fluid distribution networks can also provide for improved restart capability because the distribution network gradually moves toward unused materials allowing the system to restart more easily because mass transport can be reduced.

Figure 8:
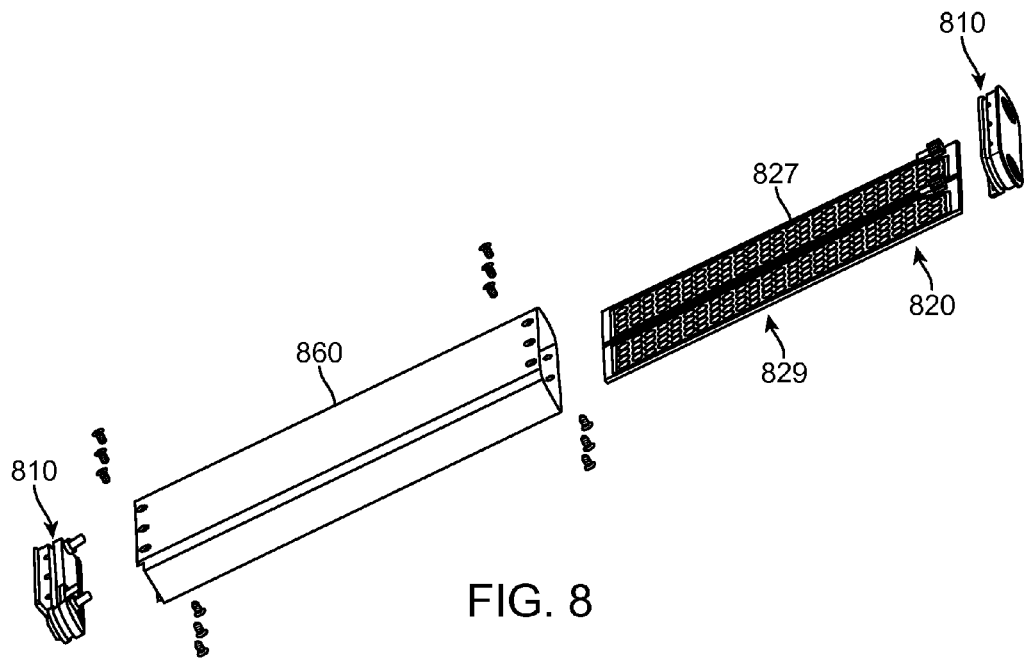
FIG. 8 illustrates aspects of a gas generating system in an exemplary implementation of the present disclosure.
Figure 9:
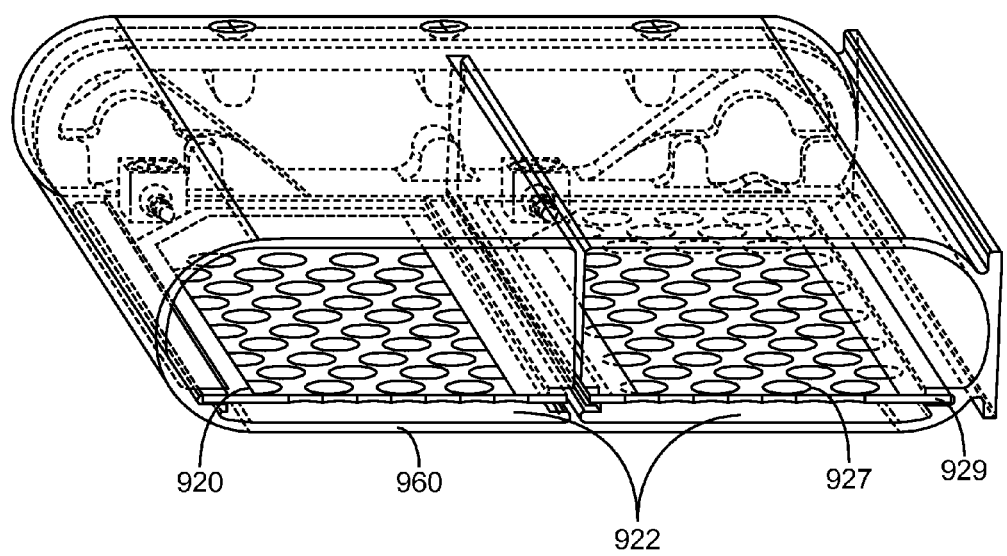
FIG. 9 illustrates aspects of a gas generating system in an exemplary implementation of the present disclosure.

The cartridge and internal compartment can be provided with various geometric cross-sections and configurations. Exemplary implementations are depicted in FIGS. 8 and 9, which show non-cylindrical systems. FIG. 8 depicts an exploded assembly view of aspects of a non-cylindrical gas generator according to an exemplary implementation of the present disclosure. In FIG. 8, end caps 810 are connected to a non-cylindrical outer housing 860. Non-cylindrical internal compartment side wall 820 is shown with gas permeable filter layers 827 and a perforated metal or wire screen 829. Hydrogen gas that is generated in the internal compartment (not shown) can flow through the side wall 820 into an internal gas gap (not shown) in a volume between the side wall 820 and the outer housing 860. The flow area provided by side wall 820 is advantageously greater than the flow area that could be provided in the cross-section of the end caps 810. FIG. 9 depicts a schematic of aspects of an oval-shaped gas generator design, according to an exemplary implementation of the present disclosure. Outer housing 960 surrounds an internal compartment. Gas permeable side walls 920 of the internal compartment provide for hydrogen gas flow into one or more internal gas gaps 922 in one or more volumes between the side walls 920 and the outer housing 960. Side walls 920 can be made from gas permeable filter layers 927 and a perforated metal or wire mesh 929. Fluid distribution networks 304 (not shown) can also be provided within the internal compartment.

The advantages of exemplary implementations provided in the present disclosure include reduced flow velocity through the bed material; increased separation filter area; decoupling from conductive heat transfer; and increased temperature within the internal compartment reaction volume. One typical problem with chemical hydrolysis is the tendency of the liquid byproducts to foam, which creates control and volume efficiency problems. One contributing factor to foaming is the velocity of gas flow through the reactor bed. The higher velocity, the more volume the foam volume may occur. For a typical cylindrical reactor, flow is in the direction of the axis and the flow area is the area of the circular end caps. Exemplary implementations of the present disclosure maximize the equivalent flow area by using the side wall of the cylinder as the flow area, so for the same overall flow rate, the velocity of the hydrogen gas while it is flowing through the reactor bed is minimized.

Another advantage of exemplary implementations provided in the present disclosure is that the radial constructions also minimize the chance of clogs and restrictions. In a cylindrical reactor, buildup of foaming byproducts can reach a point where the flow area and relief devices could be in danger of becoming blocked. The radial construction provides a physical separation of the reactor bed and output ports and relief devices, nearly eliminating the opportunity for clogs that may lead to over pressure issues. Since the radial flow construction has maximized the area of permeable membranes, the change of clogging is low. Additionally, the construction constitutes a double-wall containment for the byproduct, which requires multiple failures in order for the byproduct to ever be released externally.

Another advantage of exemplary implementations provided in the present disclosure is that the containment layers can also include filtration. Filtration can be both physical and chemical. Since the velocity through filtration areas is lower relative to prior art systems, the residence time in the filter materials is increased, improving the effectiveness.

Another advantage of exemplary implementations provided in the present disclosure is the decoupling of the internal compartment temperature from the outer housing, which will effectively de-couple it from ambient temperature. Many applications for hydrogen generation are in remote locations that can see wide variations in temperatures. The separation created by the exemplary implementations can reduce the impact of low and high ambient temperatures by making the internal gas gap the heat transfer bottleneck. A related advantage of exemplary implementations is that increased internal reaction temperatures can be achieved. A common issue with hydrolysis based reactions is that crystal hydrate byproducts are often formed. This traps some unreacted water into a water reactive material. The stability of these hydrates is often temperature dependent, which byproduct release water at elevated temperatures. If energy is later added either during operation, transport or storage, it is possible to release that water and generate hydrogen either unexpectedly or uncontrollable. Since water reactive control systems typically control water injection to manage gas pressure, a build up a hydrated byproduct represents a loss of control. The radial design, which decouples the internal compartment reactor bed from the external heat transfer, allows the reactor to operate at elevated temperature which do not allow for the build-up of hydrated byproducts. Since the operating temperature can be driven significantly above ambient, the danger of later reactor runaway is eliminated. Additionally, this byproduct will be air stable, so that in the event of exposure, no reaction will occur. When used with product chemistries that produce hydrated crystal products that are prone to water release below 100° C., higher internal reaction temperatures can improve product safety by leaving a more stable solid product.

A further advantage in exemplary implementations of the present disclosure is improved water efficiency. Since the systems can operate at high internal temperatures, typical hydrated byproduct are less stable, so a greater percentage of the water injected can be reacted instead of becoming bound up in hydrated byproducts.

Another advantage to the operation of exemplary implementations is rapid shutoff time. Due to effects of the previous issues of hydrated byproduct and kinetic limitation due to low operating temperatures, chemical hydride reactors can sometimes continue to generate gas for extended periods of time after liquid reactant injection has ceased. In exemplary implementations, the systems of the present disclosure operate in a dehydrated state so that gas generation stops very quickly once liquid injection ceases, improving control and safety.

The present disclosure also provides fuel cell systems comprising a fuel cell battery and a hydrogen gas generator as described herein.

The present disclosure provides methods of generating hydrogen gas. In some aspects, the methods of generating hydrogen gas comprise disposing a solid reactant material within an internal compartment of a cartridge as described elsewhere in the present disclosure, and selectively providing a liquid reactant with a fluid injection system configured to controllably provide the liquid reactant through at least one end cap of the internal compartment, into the one or more fluid distribution networks, and to the solid reactant material to initiate a reaction between the liquid reactant and the solid reactant material to release hydrogen gas.

The present disclosure provides methods of generating power comprising providing hydrogen gas generated according to the methods described herein to a fuel cell battery.

The present disclosure provides specific details for fuel cell applications, but the aspects of the present disclosure are not limited to fuel cell applications. The present disclosure can be applied to any applications for which a solid is reacted with a fluid to generate a gaseous product that is desired to be separated from a liquid or solid byproduct.

EXAMPLE 1

A typical prior art gas generator, depicted in FIG. 1A, was redesigned according to aspects of the present disclosure. In the gas generator in FIG. 1A, a fluid distribution network 1010 is disposed within a cylindrical internal compartment that contains a powder bed of solid reactant material 1002 comprising a hydrogen containing material capable of releasing hydrogen gas when contacted with a liquid reactant. In the gas generator, hydrogen is generated as water is introduced into the fluid distribution network from $H_2O$ inlet 1014. The internal compartment side walls 1016 are impermeable to hydrogen gas, which forces the hydrogen gas to flow towards flow area 1012 at the top of the cylinder, which is permeable to hydrogen gas (as illustrated by flow arrows 1018 which show approximate gas flow vectors). The internal compartment solid reactant material packing bed has dimensions of 5 cm diameter (D) and 7.7 cm length (l) for a volume of 150 mL of fuel. This accommodates 120 g powder at 0.8 g/mL density for the solid reactant material fuel utilized in one implementation. The flow area 1012 has an area (A) of 19.6 cm$^2$ (based on π*2.5 cm*2.5 cm). The gas generator is designed to generate hydrogen gas at a rate of 500 cm$^3$/minute. Accordingly, the calculated space velocity (v) of the hydrogen gas flux across the flow area 1012 would be v=(500 cm$^3$/minute)/(19.6 cm$^2$)=25.5 cm/minute. The high space velocity of the hydrogen gas product can create undesirable foaming which can impede effective generation of hydrogen gas at the desired flow rates.

To decrease the effective space velocity of hydrogen gas product, an implementation of a gas generator according to the present disclosure was designed. An exemplary implementation is depicted in FIG. 1B. The same amount of solid reactant material is disposed in an internal compartment with a different geometry and material selection. A volume of 150 mL of fuel is disposed within a cylindrical internal compartment with dimensions of 4 cm diameter (D) and 11.9 cm length (l). The internal compartment side walls 1016 are gas permeable and restrictive of liquid and solid material transport, while the end cap 1022 is gas impermeable. This design directs the flow of hydrogen, as indicated by the approximate flow vectors 1018, through the side walls 1016, which act as the flow area 1012, into an internal gas gap 1020 that is provided in a volume between the internal compartment side walls 1016 and an outer housing 1022 that is part of a casing 1024. Flow area 1012 therefore has an area (A) of approximately 150 cm$^2$ (based on π*4 cm*11.9 cm). At the same desired generated hydrogen gas flow rate of 500 cm$^3$/minute as the system in FIG. 1A, the calculated effective space velocity (v) of the hydrogen gas flux across the flow area 1012 would be v=(500 cm$^3$/minute)/(150 cm$^2$)=3.3 cm/minute. Accordingly, an approximate eight-fold reduction in space velocity can be achieved for the same volume of solid reactant material fuel and desired generated hydrogen gas flow rate.

Those of ordinary skill in the art will appreciate that a variety of materials can be used in the manufacturing of the components in the devices and systems disclosed herein. Any suitable structure and/or material can be used for the various features described herein, and a skilled artisan will be able to select an appropriate structures and materials based on various considerations, including the intended use of the systems disclosed herein, the intended arena within which they will be used, and the equipment and/or accessories with which they are intended to be used, among other considerations. Conventional polymeric, metal-polymer composites, ceramics, and metal materials are suitable for use in the various components. Materials hereinafter discovered and/or developed that are determined to be suitable for use in the features and elements described herein would also be considered acceptable.

When ranges are used herein for physical properties, such as molecular weight, or chemical properties, such as chemical formulae, all combinations, and subcombinations of ranges for specific exemplar therein are intended to be included.

The disclosures of each patent, patent application, and publication cited or described in this document are hereby incorporated herein by reference, in its entirety.

Those of ordinary skill in the art will appreciate that numerous changes and modifications can be made to the exemplars of the disclosure and that such changes and modifications can be made without departing from the spirit of the disclosure. It is, therefore, intended that the appended claims cover all such equivalent variations as fall within the true spirit and scope of the disclosure.

The invention claimed is:

1. A hydrogen gas generator comprising:
   a cartridge, the cartridge comprising:
      a casing comprising an outer housing;
      an internal compartment comprising two end caps comprising solid material impermeable to gas flow and one or more internal compartment side walls configured to be gas permeable and restrictive of liquid and solid material transport;
      a hydrogen outlet valve in the casing;
      a hydrogen flow path from a volume between one of the one or more internal compartment side walls and the outer housing to the hydrogen outlet valve;
      a solid reactant material disposed within the internal compartment, said solid reactant material comprising a hydrogen containing material capable of releasing hydrogen gas when contacted with a liquid reactant; and
      one or more fluid distribution networks disposed within the internal compartment and configured to deliver the liquid reactant to the solid reactant material; and
   a fluid injection system configured to controllably provide the liquid reactant through at least one end cap and into the one or more fluid distribution networks.

2. The hydrogen gas generator of claim 1, wherein the fluid injection system is disposed within the cartridge.

3. The hydrogen gas generator of claim 1, wherein the fluid injection system is disposed external to the cartridge.

4. The hydrogen gas generator of claim 1, wherein the solid reactant material comprises an alkali metal silicide.

5. The hydrogen gas generator of claim 1, wherein the one or more fluid distribution networks are configured to change the location of fluid distribution during operation.

6. The hydrogen gas generator of claim 1, wherein the one or more side walls comprise one or more layers of wire mesh, PTFE membrane, and fiberglass.

7. A fuel cell system comprising: a fuel cell battery; and the hydrogen gas generator of claim 1.

8. A method of generating hydrogen gas comprising:
   disposing a solid reactant material within an internal compartment of a cartridge, said cartridge comprising:
      a casing comprising an outer housing;
      an internal compartment comprising two end caps comprising solid material impermeable to gas flow and one or more internal compartment side walls configured to be gas permeable and restrictive of liquid and solid material transport;
      a hydrogen outlet valve in the casing;
      a hydrogen flow path from a volume between the one of one or more internal compartment side walls and the outer housing to the hydrogen outlet valve;
      a solid reactant material disposed within the internal compartment, said solid reactant material comprising a hydrogen containing material capable of releasing hydrogen gas when contacted with a liquid reactant; and
      one or more fluid distribution networks disposed within the internal compartment and configured to deliver a liquid reactant to the solid reactant material; and
   selectively providing the liquid reactant with a fluid injection system configured to controllably provide the liquid reactant through at least one end cap, into the one or more fluid distribution networks, and to the solid reactant material to initiate a reaction between the liquid reactant and the solid reactant material to release hydrogen gas.

9. The method of claim 8, wherein the solid reactant material comprises an alkali metal silicide.

10. The method of claim 8, wherein the one or more fluid distribution networks are configured to change the location of fluid distribution during operation.

11. The method of claim 8, wherein the fluid injection system is disposed within the cartridge.

12. The method of claim 8, wherein the fluid injection system is disposed external to the cartridge.

13. The method of claim 8, wherein the one or more side walls comprise one or more layers of wire mesh, PTFE membrane, and fiberglass.

14. A method of generating power comprising: providing hydrogen gas generated according to the method of claim 8 to a fuel cell battery.

15. A hydrogen gas generator comprising:
a cylindrical cartridge, the cylindrical cartridge comprising:
  a cylindrical casing comprising a cylindrical outer housing;
  a cylindrical internal compartment comprising two circular end caps comprising solid material impermeable to gas flow and a cylindrical side wall configured to be hydrogen-gas permeable and restrictive of liquid and solid material transport;
  a hydrogen gas outlet valve in the casing;
  a hydrogen gas flow path from an annular volume between the cylindrical side wall and the cylindrical outer housing to the hydrogen gas outlet valve;
  a solid reactant material disposed within the internal compartment, said solid reactant material comprising a powder bed of hydrogen containing material capable of releasing hydrogen gas when contacted with water; and
  one or more fluid distribution networks disposed within the internal compartment and configured to deliver the water to the solid reactant material; and
a fluid injection system configured to controllably provide the water through at least one circular end cap and into the one or more fluid distribution networks;
wherein the one or more fluid distribution networks comprise two independent spiral-shaped networks spaced axially along the cylindrical internal compartment such that one distributes water to the top of the cylindrical internal compartment while the other network distributes fluid to the bottom of the internal compartment;
wherein the fluid injection system is disposed external to the cartridge.

* * * * *